United States Patent [19]

Smith

[11] Patent Number: 4,619,190

[45] Date of Patent: Oct. 28, 1986

[54] VERTICAL BED PORTABLE COOKING GRILL

[76] Inventor: Douglas A. Smith, R.F.D. #1, Box 54, Ellsworth, Me. 04605

[21] Appl. No.: 797,115

[22] Filed: Nov. 12, 1985

[51] Int. Cl.⁴ .............................................. A47J 37/00
[52] U.S. Cl. ...................................... 99/393; 99/400; 99/402; 99/446; 99/447; 99/448; 99/449; 126/9 B; 126/25 A
[58] Field of Search ................. 99/393, 400, 402, 446, 99/447, 448, 449; 126/9 R, 25 R, 25 A, 9 B; 426/523

[56] References Cited

U.S. PATENT DOCUMENTS

| | | | |
|---|---|---|---|
| 2,201,756 | 5/1940 | Avetta | 99/393 X |
| 2,734,499 | 2/1956 | Lombardi | 99/393 X |
| 2,774,345 | 12/1956 | Peplin | 99/393 X |
| 2,828,733 | 4/1958 | Moore | 99/393 X |
| 2,946,275 | 7/1960 | Compton | 99/400 X |
| 3,052,177 | 9/1962 | Lombardo | 99/400 X |
| 3,056,344 | 10/1962 | Miller | 99/400 X |
| 3,389,651 | 6/1968 | Schultz | 99/400 X |
| 3,421,433 | 1/1969 | Vitale | 99/400 X |
| 3,495,524 | 2/1970 | Miles | 99/400 X |
| 3,550,525 | 12/1970 | Rabello | 99/448 X |
| 3,581,654 | 6/1971 | Tescula | 99/400 X |
| 3,611,912 | 10/1971 | Choc | 99/449 X |

FOREIGN PATENT DOCUMENTS 273704 10/1965 Australia ............................. 99/393
167890 3/1905 Fed. Rep. of Germany ........ 99/448

Primary Examiner—Billy J. Wilhite
Attorney, Agent, or Firm—Daniel H. Kane, Jr.

[57] ABSTRACT

A vertically oriented fuel bed elongate in the vertical direction provides a vertical radiant source of heat for cooking food in cooking zones on either side of the bed. A portable and collapsible grill frame is formed by light weight end rods and elongate cross rods assembled in three tiers, a top tier, a lower tier, and base level. The vertical radiant heat source is supported in the center of the frame removeably suspended from the top tier without extending below the lower tier. An ash tray is removeably suspended from the lower tier below the fuel bed and above the base level. First and second drip trays are removeably suspended from the lower tier below the cooking zones on either side of the ash tray. The ash tray and drip trays form a substantially continuous surface across the grill frame for reflecting heat upward and protecting a surface on which the grill may be placed. A plurality of removeable and replaceable panels provide greater or lesser enclosure of a cooking zone. The end rods and elongate cross rods are releaseably coupled by complementary slots formed by crimps and folds in the rods.

20 Claims, 11 Drawing Figures

VERTICAL BED PORTABLE COOKING GRILL

TECHNICAL FIELD

This invention relates to an improved portable cooking grill or stove having a vertical fuel bed or radiant heat source for cooking food from the side rather than from beneath.

BACKGROUND ART

Cooking grills, barbecues and stoves have been developed with vertical fuel beds or vertically disposed sources of heat for cooking foods from the side rather than from below. By such configurations fats and other juices from cooking do not run into the fire or other direct heat source and the fat cannot burn to form carcinogens. When the fats do burn, as noted by Stuart Berger, M.D., in his book *Immune Power Diet*, ". . . charcoal broiling a piece of steak is worth 600 cigarettes in its cancer potential." For example, the Luschen et al. U.S. Pat. No. 3,742,838 and the Rensch et al. U.S. Pat. No. 3,182,585 describe grills with two vertical fuel burning beds disposed on either side of the cooking zone. The Miceli U.S. Pat. No. 3,211,081 describes an annular cylindrical configuration vertical bed for radially surrounding a cooking zone on all sides.

A number of devices provide both vertical and horizontal cooking beds either simultaneously as in the Berger U.S. Pat. No. 4,089,258 or by successive rotation of one or more fuel beds between horizontal and vertical positions as described in the Vitale U.S. Pat. No. 3,421,433 and the Rensch et al. U.S. Pat. No. 3,182,585 referred to above. A variety of fuel sources have been used for the vertically disposed bed or radiant heat source including electrical heating elements, gas burners, and charcoal combustion fireboxes such as the variable charcoal firebox described by Belford in U.S. Pat. No. 3,832,989. These cooking grills or stoves are generally of elaborate or relatively heavy weight construction or are not well adapted for disassembly and portability.

The Tescula U.S. Pat. Nos. 3,581,654 and 3,604,408, the Turcott et al. U.S. Pat. No. 3,319,562 and the Rabello U.S. Pat. No. 3,550,525 describe vertical bed grills with wire mesh or rods for lighter weight construction. These stoves or grills, however, cannot provide the additional advantages of "reflector oven" enclosures and are not readily disassembled.

OBJECTS OF THE INVENTION

It is therefore an object of the present invention to provide a new cooking grill or stove with vertical type fuel bed or radiant heat source which is of light weight rod construction and which is readily disassembled and portable.

Another object of the invention is to provide a portable light weight vertical bed grill which is self-supporting and provides adequate protection from below for use on any surface.

A further object of the invention is to provide a light weight, portable cooking grill or stove which also affords the advantages of reflector oven enclosure for oven baking at the same time as open roasting or grilling. The cooking grill is also flexibly constructed for cooking a variety of food in different configurations.

DISCLOSURE OF THE INVENTION

In order to accomplish these results the present invention provides a vertically oriented fuel bed elongate in the vertical direction providing a radiant heat source for cooking food in cooking zones on either side of the bed. A portable ano collapsible grill frame of rectangular configuration is formed by light weight rods assembled in three tiers, a top tier, a lower tier, and a base. The vertical bed or radiant source of heat is supported in the center of the frame, removeably suspended from the top tier while not extending below the lower tier.

According to the invention, an ash tray is removeably suspended from the lower tier below the vertically oriented fuel bed but above the base so that the ash tray and fuel bed are supported or suspended by the frame a safe distance above a surface on which the grill may be placed. First and second drip trays are also removeably suspended from the lower tier below the cooking zones on either side of the vertically oriented fuel bed and adjacent to the ash tray. A feature and advantage of this arrangement is that the ash tray and drip trays form a substantially continuous surface between the lower tier and base across the grill frame for reflecting heat upward and to protect a surface on which the grill is sitting. Furthermore, the ash tray and drip trays are easily removeable from the grill frame for cleaning and for portability.

The grill frame includes end rods rigidly assembled into end frame pieces having the three tiers. Elongate cross rods removeably extend between the end frame pieces at the upper and lower tiers for suspending the vertically oriented fuel bed or heat source, ash tray and drip trays respectively from the end frame pieces.

In the preferred example embodiment the lower tier comprises four elongate cross rods extending between the end frame pieces. The ash tray is suspended from the middle two cross rods and the drip trays are suspended from the outer two cross rods on either side so that the ash tray and drip tray overlap forming a continuous surface across the grill below the vertical radiant heat source. The top tier includes two elongate cross rods extending between the end frame pieces at the center of the grill frame for suspending the vertically oriented fuel bed from the top tier. One or more support rods also extend between the top tiers of the end frame pieces over the cooking zones for suspending food to be cooked on either side of the vertical bed. A feature and advantage of this arrangement is that the essential elements of the grill are suspended for easy removal and the detailed construction features of the grill frame rod assembly hereafter described permit the grill frame itself to be readily disassembled.

For coupling the elongate cross rods and the end rods, the elongate rods are formed adjacent to each end with a crimp and a spaced bend or fold defining first retaining slots at the ends of the elongate rods. The rods are formed with spaced crimps and bends at specified locations defining second retaining slots complementary with the first retaining slots in the elongate rods for releaseably coupling the elongate rods and end rods. The configurations of the crimps and slots in the end rods define both insertion slots for receiving the ends of the elongate rods and second retaining slots complementary with the first retaining slots in the elongate rods for coupling the rods together. Elongate spring elements bonded to the end rods extend over the slots for yielding coupling and uncoupling of the rods and for holding the elongate rods in coupled position.

The invention also provides panels for reflector oven enclosure of the grill frame including end panels extending from the top tier to the lower tier over the end frame pieces. The end panels may be rigidly secured or bonded to the end frame pieces for structural support of the grill frame. At least one cover panel and one side panel extend between the end frame pieces over the top and side of one cooking zone for reflector oven enclosure. The cover panel and side panel are removeable and replaceable on the grill frame and are constructed for use alone or in combination on the grill frame to provide lesser or greater enclosure of the cooking zone. A feature of this construction arrangement is that one cooking zone of the grill may be used for oven enclosure baking while the other is used for open roasting and grilling.

A variety of structures are provided for supporting and suspending food in the cooking zones from the upper tier of the grill frame. To this end the top tier of end rods and end panels of the end frame pieces are notched, indented or corrugated to receive and accommodate support rods and for hanging food racks of various configuration.

The cover panel and side panel may be hinged together for positioning over the top and side of one of the cooking zones. Vertical corner rods may be provided with extensions above the top tier to facilitate hanging the panels. The vertically oriented radiant heat source may be for example a charcoal basket suspended at the center of the frame or for example a gas fired bed of "lava rock".

Other objects, features and advantages of the invention are apparent in the following specifications and accompanying drawings.

DESCRIPTION OF PREFERRED EXAMPLE EMBODIMENT AND BEST MODE OF THE INVENTION

Figure 1:
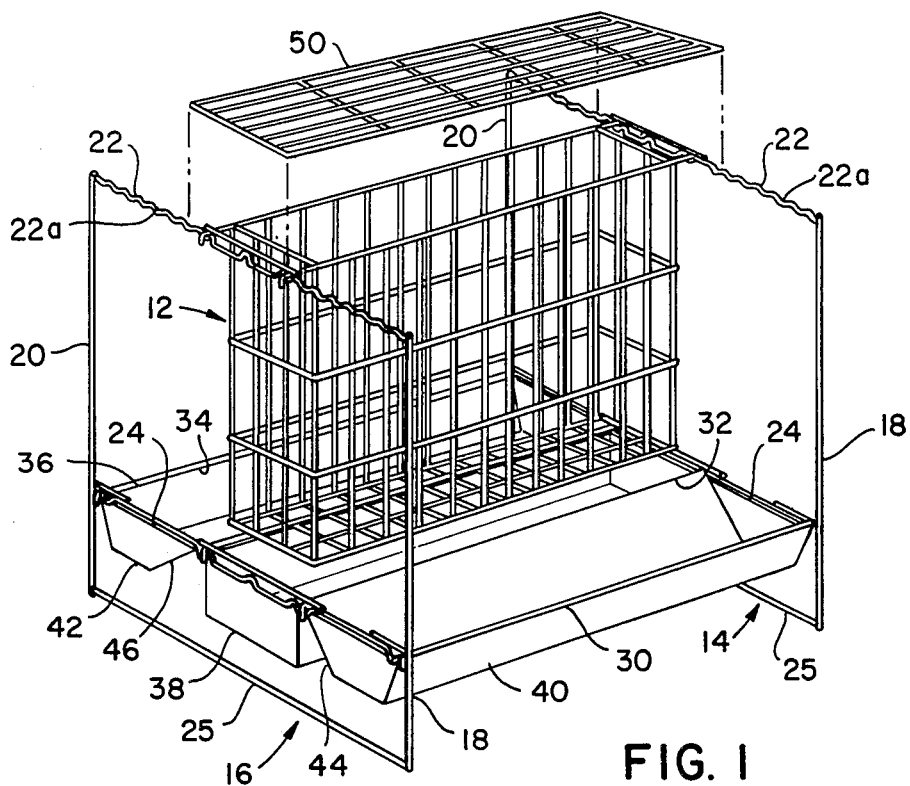
FIG. 1 is a perspective view of the vertical bed portable cooking grill with an optional horizontal cooking grill surface in exploded position.
Figure 2:
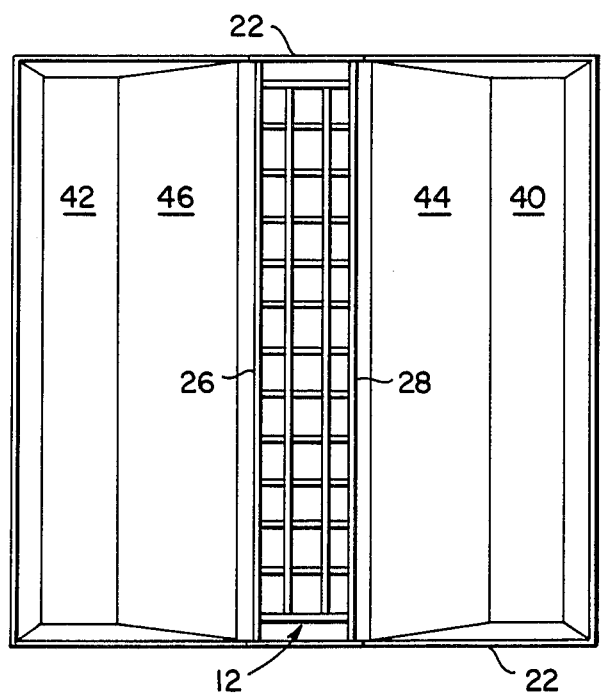
FIG. 2 is a plan view of the cooking grill.

In the vertical bed portable cooking grill 10 according to the invention illustrated in FIGS. 1 and 2, a vertically oriented charcoal basket 12 is suspended at the center of the rectangular element configuration grill frame. In this example the vertical charcoal basket 12 provides the vertically oriented radiant heat source for cooking zones defined on either side of the basket. The grill frame can be identified as having three tiers with basket 12 suspended from the top tier.

The grill frame is constructed from light weight metal rods and the end rods are rigidly assembled into end frame pieces 14 and 16. Each end frame piece 14 and 16 is formed by two vertical end rods or corner rods 18 and 20 and three horizontal rods 22, 24, and 25 rigidly joined to the vertical corner rods respectively to form the top tier, lower tier and base levels. Two elongate cross rods 26 and 28 extend between the upper tier or top tier end rods 22 at the center of the grill frame for suspending the charcoal basket 12 or other vertically oriented heat source. Four elongate cross rods 30, 32, 34, and 36 extend between the lower tier end rods 24.

An ash tray 38 is suspended from the middle or center cross rods 32 and 34 while drip trays 40 and 42 are suspended from the outer pairs of cross rods 30, 32 and 34, 36 respectively. The drip trays 40 and 42 are formed with inclined surfaces 44 and 46 sloping away from the vertical fuel bed and radiant heat source 12 for diverting fats and juices from cooking away from the fire to avoid burning.

As shown in FIG. 1, an alternative horizontal grill surface 50 may be provided for cooking food from below. Such a horizontal grill 50 rests on the bed 12 and top tier end rods 22. According to the invention, however, food is normally cooked in the cooking zones on either side of the vertical bed or radiant heat source 12.

Figure 3:
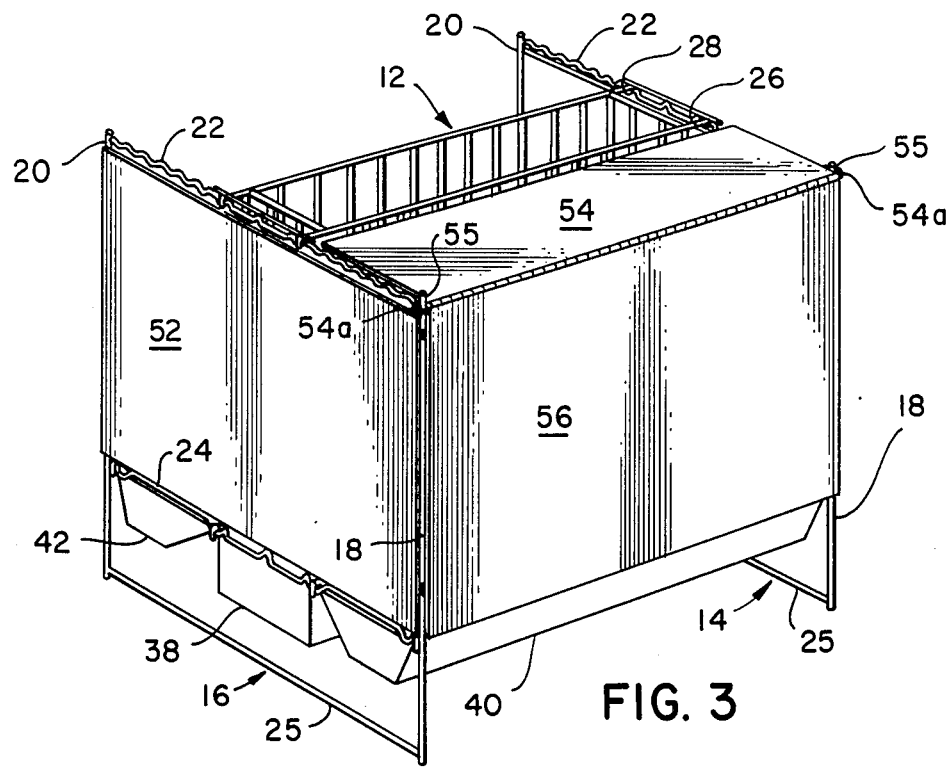
FIG. 3 is a perspective view of the cooking grill with end panels, cover panel and side panel in place providing a reflective oven enclosure over one cooking zone.

At least one of the cooking zones on one side of the bed 12 may be substantially entirely enclosed in a reflector oven enclosure by panels as illustrated in FIG. 3. End panels 52 are rigidly secured to the end frame pieces 14 and 16 of the grill frame. The end panels 52 are rigidly secured to the end rods for example between the top tier end rods 22 and vertical corner rods 18 and 20, terminating just above the lower tier end rods 24, to provide greater rigidity and structural support to the grill frame. The top of the end panels 52 may be cut out or corrugated so that they do not interfere in the notch or slot configurations of the end rods hereafter described. In addition a top cover 54 is provided which rests on the top tier end rods 22 on one side of the grill frame over one of the cooking zones along with a side panel 56 hinged to the top cover for suspension by hanging from the hinge over the side of the cooking zone.

The cooking zone on the panel side of the fuel basket 12 is therefore substantially entirely enclosed by the end panels 52, top cover 54, side panel 56 and drip tray or pan 40. For hanging the cover and side panels 54 and 56 from the grill frame, the vertical end rods or corner rods 18 and 20 can be provided with extensions 55 extending above the top tier rods 22. The corners of the top cover 54 can be provided with cutouts or loops 54a fitting over the extensions 55 for securing the cover panel and hinged side panel in place. Panels may of course be provided for both sides of the cooking grill but in any event are removeable and replaceable on either side. Furthermore, because of the hinged coupling between the cover panel and side panel, selected panels can be opened for only partial enclosure of the cooking zone.

Figure 4:
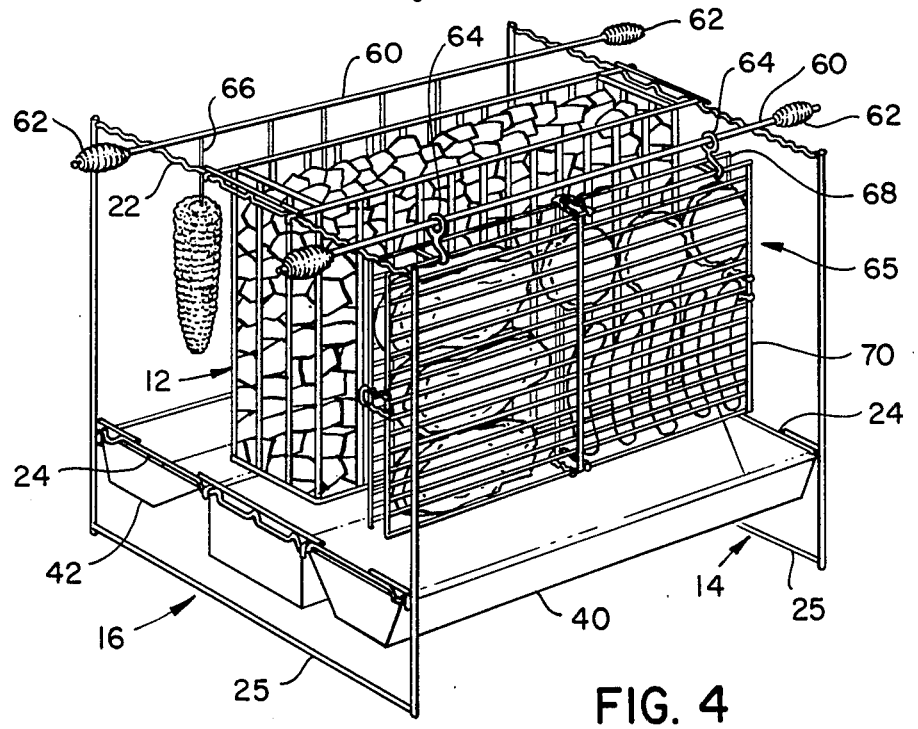
FIG. 4 is a perspective view of the cooking grill with food suspended in the cooking zones by food supporting structures of the invention including support rods, vegetable skewer and meat clamping rack.

As also shown in FIGS. 1 and 3 the top tier rods 22 are corrugated with folds or scallops for receiving support rods 60 and retaining the support rods in position over the cooking zones on either side of the vertical fuel bed 12 as shown in FIG. 4. The top edges of end panels 52 may also be corrugated or scalloped to accommodate and retain the support rod 60. The support rods 60 rest in the corrugations of the top tier end rods 22 and are made with coil or spring handles 62 at each end to dissipate heat for handling. Sliding rings 64 are mounted for sliding along the rod 60 with depending hooks for holding food supporting structures such as the meat clamping rack 65 and the vegetable skewer 66.

Figure 4A:
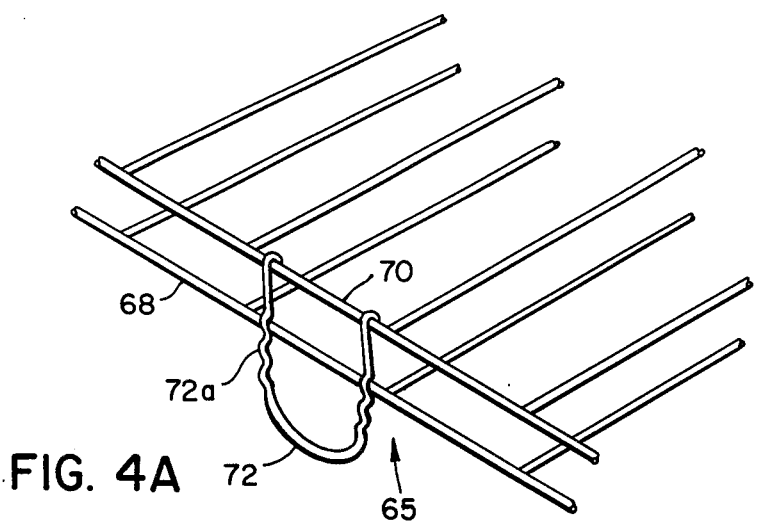
FIG. 4a is a detailed fragmentary view of a portion of the vertically oriented meat clamping rack or grill of FIG. 4.

The meat rack 65 is formed by two meat rack elements 68 and 70. As shown in more detail in FIG. 4a, one of the meat rack elements 70 is formed with spring clips 72 extending at substantially right angles from the side edges of the rack 70. The spring biased clip 72 is formed with corrugations or indentations 72a for engaging the side edges of the other rack element 68 at selected spaced apart distances for clamping food to be cooked between the racks.

Figure 5:
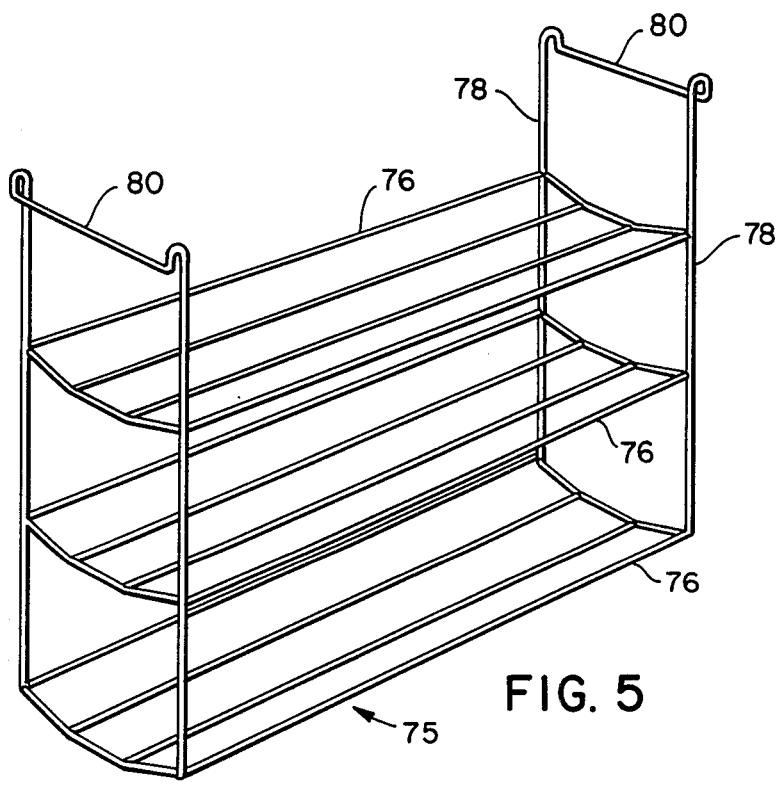
FIG. 5 is a perspective view of a multi-level horizontal rack for supporting food in a cooking zone of the cooking grill.

A multi-level fooo cooking holder 75 is illustrated in FIG. 5. The cooking holder 75 is formed with three horizontal racks 76 mounted on vertical legs 78 which are folded at the top to provide hanging handles 80 for hanging from the top tier rods 22 of the grill frame. Food on the multi-level racks 76 is therefore suspended in the cooking zones on either side of the vertical bed radiant heat source 12.

Figure 6:
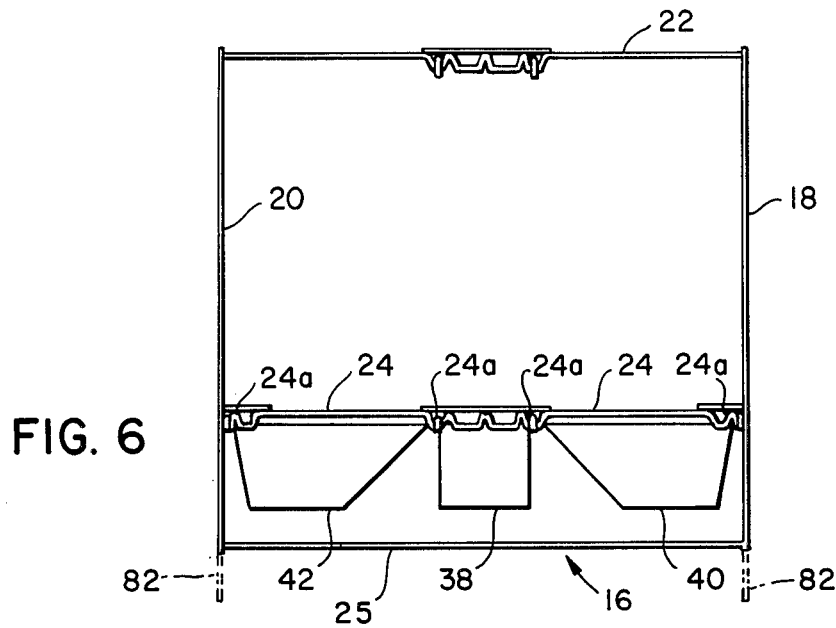
FIG. 6 is a plan view of an end frame piece.

In order to maintain the elongate cross rods on the lower tier of the grill frame in position, the lower tier end rods 24 are indented with notch configurations 24a at the locations of the elongate cross rods as illustrated in FIG. 6. The notches or indentations 24a receive and retain the elongate cross rods 30, 32, 34, and 36 for maintaining the ash tray 38 and drip trays 40 and 42 suspended in position, as shown in dashed outline in FIG. 6. Similarly, the upper tier end rods 22 are indented with notch configurations 22a to receive and retain the elongate rods 26 and 28 from which the fuel basket or other radiant heat source is suspended.

Figure 7:
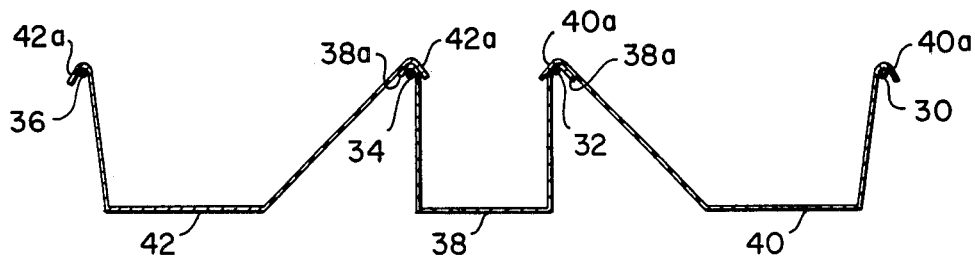
FIG. 7 is a fragmentary side cross-section through the trays at the middle of the frame.

The relationship of the respective trays over the elongate cross rods 30, 32, 34, and 36 is shown in the partial cross section through the trays in the middle of the grill frame illustrated in FIG. 7. Thus, the ash tray 38 is formed with folded edges 38a which are hooked over the cross rods 32 and 34. The drip trays 40 and 42 are formed with folded upper edges 40a and 42a respectively for hooking or hanging over the outer sets of cross rods 30, 32 and 34, 36 respectively. The overlapping edges effectively provide a continuous surface between the lower tier cross rod 24 and base rod 25 for reflecting heat upward into the cooking zones and protecting any combustible surface on which the cooking grill is positioned.

The base level of the cooking grill is provided by the end rods 25 which may also provide the base rests for the cooking grill. Alternatively, the vertical end rods or corner rods 18 and 20 may be provided with downward extensions 82 below the base level end rods 25 to provide four separate and distinct legs or feet for placement of the cooking grill on a surface.

Figure 8:
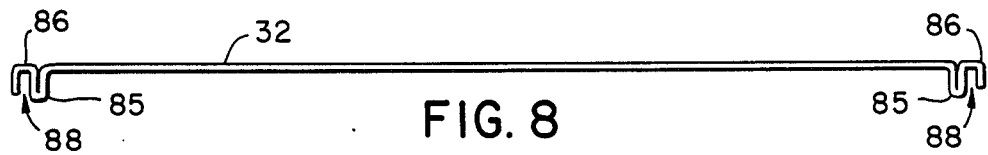
FIG. 8 is a detailed side view of an elongate rod.
Figure 9:
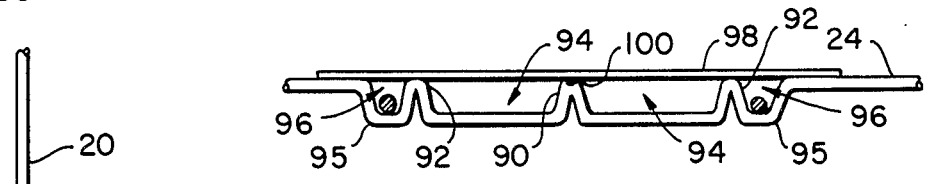
FIG. 9 is a detailed fragmentary side view of the center portion of an end rod.
Figure 10:
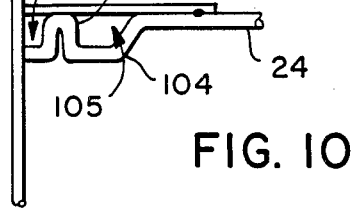
FIG. 10 is a detailed fragmentary side view of the junction of an elongate rod and a vertical corner rod.

The coupling of the elongate rods and end rods is shown in detail in FIGS. 8–10. The elongate rods, for example elongate rod 32 shown in FIG. 8 are formed adjacent to each end with a crimp 85 and spaced apart bend or fold 86 defining first retaining slots 88 at each end of the elongate rods. Similarly the end rods, for example end rod 24 shown in FIG. 9 is formed with crimps and bends defining complementary slots.

In particular each end rod is formed with a center crimp 90 and spaced apart side crimps 92 defining horizontal insertion slots 94 for receiving the ends of the elongate rods when the rods are turned with the crimps 85 and bends 86 oriented horizontally. Additional side bends 95 define with the side crimps 92 second retaining slots 96 complementary with the first receiving slots 88 for coupling between the crimps and bends 85, 86 and 92, 95 respectively with the crimps and bends oriented vertically.

As also shown in FIG. 9, an elongate spring element 98 is bonded to the center crimp 90, by for example spot weld 100 so that the spring element 98 extends over the insertion slots 94 and retaining slots 96. The spring element 98 may be, for example, a light metal rod or strip which permits yielding coupling of the elongate rod and end rod at the complementary slots 88 and 96 and which holds the elongate rod in place in the coupled position.

The end of end rod 24 at vertical corner rod 20 is shown in FIG. 10. The crimp 102 and bend 104 define insertion slot 105, for receiving the end of an elongate rod. The very end tip of end rod 24 is bonded or welded to the vertical corner rod 20 so that crimp 102 and rod 20 define a second retaining slot 6 for coupling with a complementary first retaining slot 88 of an elongate rod.

While the invention has been described with reference to particular example embodiments it is intended to cover all modifications and equivalents within the scope of the following claims.

I claim:
1. An improved cooking grill comprising:
   a vertically oriented fuel bed elongate in the vertical direction providing a vertical radiant source of heat for cooking food in cooking zones on either side of the bed;
   a portable and collapsible grill frame of rectangular configuration formed by light weight rods assembled in three tiers, a top tier, a lower tier and base level;
   said vertical radiant source being supported in the center of the frame removeably suspended from the top tier and not extending below the lower tier;
   an ash tray removeably suspended from the lower tier below the vertically oriented fuel bed but above the base level so that the ash tray and vertically oriented fuel bed are supported by the frame a safe distance above a surface on which the grill may be placed;
   first and second drip trays removeably suspended from the lower tier below the cooking zones on either side of the vertically oriented fuel bed and adjacent to the ash tray, said ash tray and drip trays comprising a substantially continuous surface between the lower tier and base tier across the grill frame for reflecting heat upward to protect a surface on which the grill may be placed, said ash tray and drip trays being removeable from the grill frame for cleaning and for portability;

said grill frame comprising end rods rigidly assembled in rectangular end frame pieces having said three tiers, and elongate cross rods removeably extending between the end frame pieces at the upper and lower tiers for suspending the vertically oriented fuel bed, ash tray and drip trays from the end frame pieces;

a plurality of panels for providing reflector oven enclosure of the grill frame including end panels extending from the top tier to the lower tier over the end frame pieces of the grill frame and at least one side panel and cover panel extending between the end frame pieces over the top and side of one cooking zone of the grill frame;

said side panel and cover panel being removeable and replaceable on the grill frame and constructed and arranged for use alone or in combination on the grill frame to provide lesser or greater enclosure of the cooking zone for varying oven enclosure effects;

2. The cooking grill of claim 1 wherein the drip trays are formed with a sloping surface sloping away from the vertical radiant heat source for draining and diverting fat away from the heat source.

3. The cooking grill of claim 1 wherein the lower tier comprises four elongate cross rods extending between the end frame pieces, wherein the ash tray is suspended from the middle two cross rods, and wherein the drip trays are suspended from the outer two cross rods on either side so that the ash tray and drip trays overlap forming a continuous surface across the grill below the vertical radiant heat source.

4. The cooking grill of claim 1 wherein the vertically oriented fuel bed comprises a charcoal basket for supporting a charcoal fire as the vertical radiant heat source.

5. The cooking grill of claim 3 wherein the top tier of the grill frame comprises two elongate cross rods extending between the end frame pieces at the center of the grill frame, said vertically oriented fuel bed being suspended from said elongate cross rods.

6. The cooking grill of claim 5 further comprising at least one elongate support rod for extending between the top tiers of the end frame pieces over the cooking zones, said support rods being formed with suspension means for suspending food to be cooked on either side of the vertical radiant heat source.

7. The cooking grill of claim 6 further comprising skewer means formed with a hook at one end for suspending from a support rod.

8. The cooking grill of claim 6 further comprising meat rack means including first and second flat racks, at least one rack comprising spring biased clip means having a corrugated or indented surface extending at substantially right angles from the side edges of the rack for engaging side edges of the other rack at selected spaced apart distances from the first rack for clamping food to be cooked between the racks.

9. The cooking grill of claim 6 wherein the top tier end rods of the end frame pieces are corrugated to receive and accommodate the ends of said elongate support rods.

10. The cooking grill of claim 5 wherein the elongate cross rods are formed adjacent to each end with a crimp and spaced apart bend or fold defining first retaining slots at the ends of the elongate cross rods, and wherein the end rods are formed with spaced crimps and bends at specified locations defining second retaining slots complementary with the first retaining slots for releaseably coupling the end rods and elongate cross rods.

11. The cooking grill of claim 5 further comprising a multi-level food cooking holder including a plurality of horizontal racks mounted on vertical legs, said legs being folded and arranged at the top to provide handle means for hanging from the top tiers of the end frame pieces for holding food on the multi-level racks in the cooking zones on either side of the vertical radiant heat source.

12. The cooking grill of claim 1 wherein the cover panel is hinged to the side panel, said cover panel being positioned on the top tier of the end frame pieces, said side panel being hingedly suspended from the cover panel.

13. The cooking grill of claim 12 wherein the end frame pieces comprise vertical corner rods, said vertical corner rods having extensions extending above the top tier, and wherein the cover panel is formed with loops for fitting over the extensions of the vertical corner rods for holding the cover panel in place.

14. The cooking grill of claim 1 wherein the end panels are rigidly secured to the end rods of the end frame pieces to impart greater structural support to the grill frame.

15. The cooking grill of claim 14 wherein the end panels are notched or corrugated across the top to accommodate elongate support rods extending between the end frame pieces.

16. An improved cooking grill comprising:

a portable and collapsible grill frame of rectangular configuration formed by light weight rods assembled in three tiers, a top tier, a lower tier and base level;

a vertically oriented fuel bed elongate in the vertical direction providing a vertical radiant source of heat for cooking food in cooking zones on either side of the bed, said vertical radiant source being supported in the center of the frame removeably suspended from the top tier and not extending below the lower tier;

an ash tray removeably suspended from the lower tier below the vertically oriented fuel bed but above the base level so that the ash tray and vertically oriented fuel bed are supported by the frame a safe distance above a surface on which the grill may be placed;

first and second drip trays removeably suspended from the lower tier below the cooking zones on either side of the vertically oriented fuel bed and adjacent to the ash tray, said ash tray and drip trays comprising a substantially continuous surface between the lower tier and base level across the grill frame for reflecting heat upward to protect a surface on which the grill may be placed, said ash tray and drip trays being removeable from the grill frame for cleaning and for portability, said drip trays being formed with a sloping surface sloping away from the vertical radiant heat source for draining and diverting fat away from the heat source;

said grill frame comprising end rods and vertical corner rods rigidly assembled in rectangular end frame pieces including said three tiers, and elongate cross rods removeably extending between the end frame pieces at the upper and lower tiers for suspending the vertically oriented fuel bed, ash tray and drip trays from the end frame pieces, said lower tier comprising four elongate cross rods extending between the end frame pieces, wherein the ash tray is suspended from the middle two cross rods, and wherein the drip trays are suspended from the outer two cross rods on either side so that the ash tray and drip trays overlap forming a continuous surface across the grill below the vertical radiant heat source, said top tier of the grill frame comprising two elongate cross rods extending between the end frame pieces at the center of the grill frame, said vertically oriented fuel bed being suspended from said two elongate cross rods;

at least one elongate support rod for extending between the top tiers of the end frame pieces over the cooking zones, aid support rods being formed with suspension means for suspending food to be cooked on either side of the vertical radiant heat source;

a plurality of panels for providing reflector oven enclosure of the grill frame including end panels extending from the top tier to the lower tier over the end frame pieces of the grill frame and at least one side panel and cover panel extending between the end frame pieces over the top and side of one cooking zone of the grill frame, said cover panel being hinged to the side panel for positioning of the cover panel on the top tier of the end frame pieces with the side panel being hingedly suspended from the cover panel, said side panel and cover panel being removeable and replaceable on the grill frame and constructed and arranged for use alone or in combination on the grill frame by folding at the hinge to provide lesser or greater enclosure of the cooking zone for varying oven enclosure effects.

17. The cooking grill of claim 16 wherein the elongate rods are formed adjacent to each end with a crimp and a spaced apart bend or fold defining first retaining slots at the ends of the elongate rods, wherein the end rods are formed with a center crimp and spaced apart side crimps on either side of the center crimp defining horizontal insertion slots for receiving the ends of the elongate cross rods, said end rods also being formed with side bends spaced from the side crimps defining second retaining slots between the side crimps and side bends complementary with the first retaining slots for releaseably coupling the elongate cross rods and end rods, said end rods further comprising an elongate spring element bonded to the center crimp and extending over the slots defined by the side 4 crimps and side bends, said spring element being arranged for yielding coupling and uncoupling of the end rods and elongate cross rods and for urging the rods in a coupled position.

18. The cooking grill of claim 17 wherein the end rods are formed adjacent to each end with a crimp and spaced apart bend defining an insert slot for receiving the end of an elongate rod and wherein the crimp defines with a vertical corner rod a second retaining slot complementary with the first retaining slot, said end rods further comprising elongate spring elements bonded to the end rods and extending in parallel over the second retaining slots defined by the crimps and bends adjacent to each end for yielding coupling and uncoupling of the end rods and elongate cross rods and for holding the rods in a coupled position.

19. The cooking grill of claim 16 wherein the top tier of the end rods and the top of the end panels are notched, indented or corrugated to receive and accommodate the elongate support rods.

20. The cooking grill of claim 16 wherein the end frame pieces comprise vertical corner rods, said vertical corner rods having extensions extending above the top tier for holding a cover panel and side panel in place and extensions below the base level to provide separate feet on which the cooking grill rests.

* * * * *